United States Patent [19]
Vogler

[11] 3,871,783
[45] Mar. 18, 1975

[54] CONNECTING DEVICE FOR LOAD BEARING MEMBERS

[75] Inventor: Paul A. Vogler, Westminster, Calif.

[73] Assignee: "Strolee" of California, a division of U.S. Industries, Inc., New York, N.Y.

[22] Filed: June 13, 1974

[21] Appl. No.: 479,163

[52] U.S. Cl......... 403/205, 280/87.02 W, 248/188.9
[51] Int. Cl............................................... F16b 9/00
[58] Field of Search ............ 403/205, 403, 26, 301, 403/306; 248/188.8, 188.9; 16/18 R, 29; 280/79.1, 79.2, 79.3, 87.02 W, 47.19, 47.26, 47.38

[56] References Cited
UNITED STATES PATENTS
| | | | |
|---|---|---|---|
| 2,624,469 | 1/1953 | Cadwell et al. | 16/18 R UX |
| 2,727,346 | 12/1955 | Witwer | 280/35 X |
| 2,762,669 | 9/1956 | Watson | 280/79.3 X |

Primary Examiner—Werner H. Schroeder
Assistant Examiner—Wayne L. Shedd
Attorney, Agent, or Firm—Lyon & Lyon

[57] ABSTRACT

Disclosed herein is a device for connecting two load bearing members comprising an elbow bracket having an insert therein and arms extending upwardly therefrom, wherein the arms receive one of the load bearing members and the insert receives the other to connect the members.

8 Claims, 4 Drawing Figures

PATENTED MAR 18 1975 3,871,783
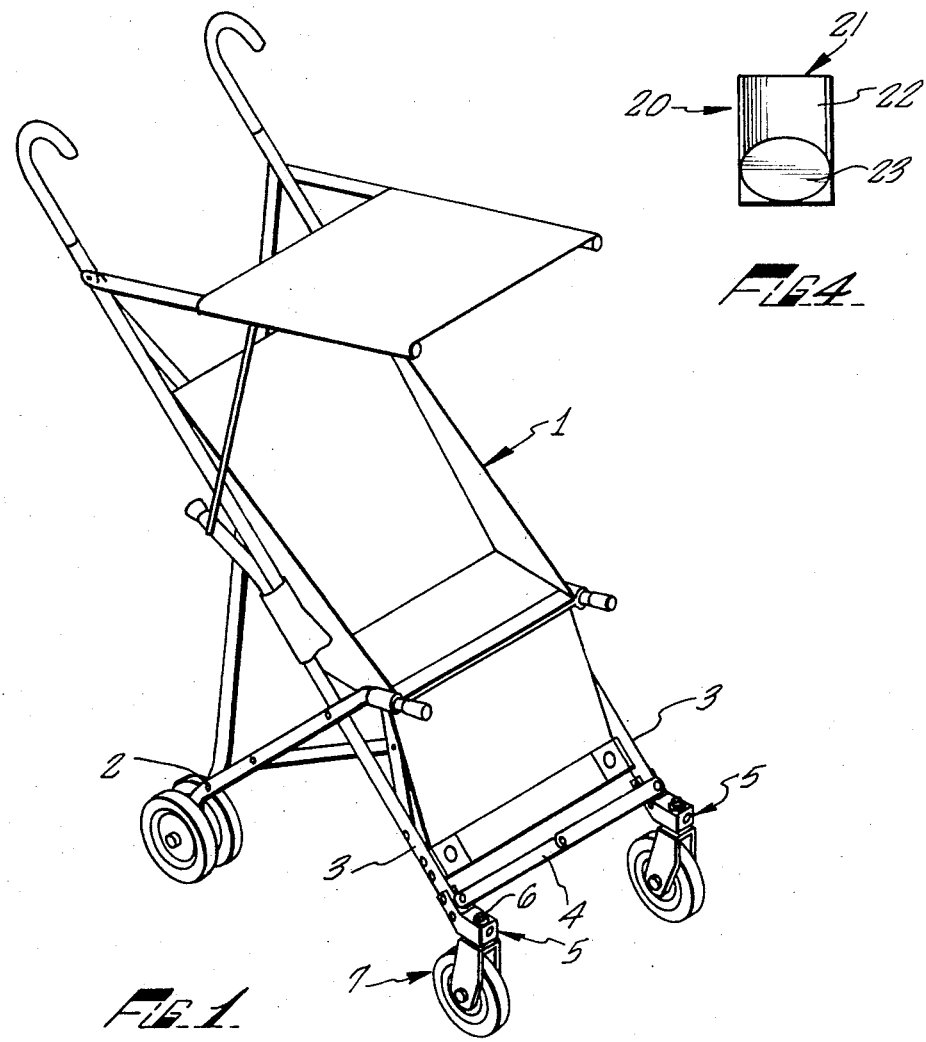
FIG.4
FIG.1
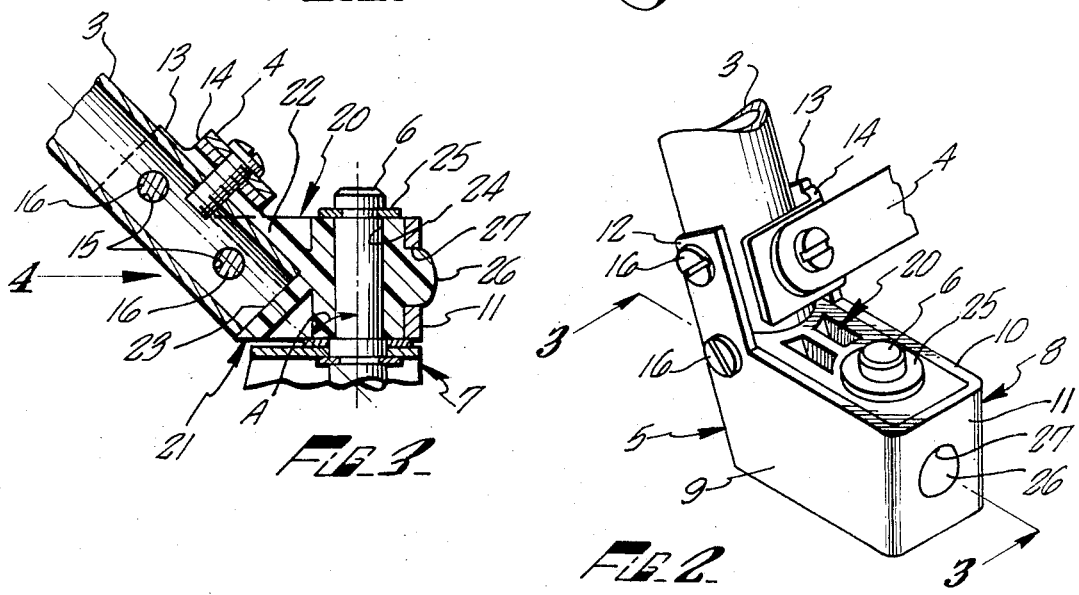
FIG.3
FIG.2

CONNECTING DEVICE FOR LOAD BEARING MEMBERS

BACKGROUND OF THE INVENTION

The invention disclosed herein relates to devices for connecting load bearing members to each other. Examples of apparatus wherein the device of the invention may be employed are wheeled carts, as for example baby carriages, shopping carts, luggage carts and the like, having load bearing support members extending downwardly therefrom to which wheel assemblies having upwardly extending load bearing members are attached. It is desirable that one or more of the support members extend downwardly from the body of the cart in a substantially non-vertical direction. It is also often desirable to provide such carts with swivel wheel assemblies which allow the cart to be easily steered or maneuvered, as for example caster wheels.

While wheel assemblies fixed in their alignment in relation to the support members may readily be connected to non-vertical support members by an ordinary axle arrangement, substantial difficulty may be encountered when it is desired to place movable wheel assemblies on non-vertical support members. One such cart is the folding baby carriage disclosed in U.S. Pat. No. 3,390,893, the disclosure of which is incorporated herein by reference. Such carriages derive advantage from non-vertical support members. However, in order to promote safety and ease of handling, it is desirable that they be equipped with swivel front wheels. FIG. 4 of the aforesaid patent depicts a fixed double wheel assembly attached to four support members of the baby carriage. The front support members are bent so that their lower portions bear vertically downward near the point they contact the wheel assembly. Although it would be possible to insert a conventional caster wheel assembly into the bottom of the vertically bent support members of such a carriage to obtain desirable steering characteristics, bending of the support legs may create undesirable stress profiles therein.

One object of the present invention is to provide a connecting device for directly connecting non-vertical, downwardly extending load bearing members to vertically, upwardly extending load bearing members.

A further object of the invention is to provide a connector device which increases the safety and maneuverability of assemblies having vertical and non-vertical load bearing members by providing means whereby a swivel wheel assembly may be facilely connected to the non-vertical load bearing member.

SUMMARY OF THE INVENTION

The invention herein comprises a connector device for connecting a generally non-vertically, downwardly extending load bearing support member to a substantially vertically, upwardly extending load bearing member. The connector device comprises an elbow bracket including a forward component in which is received an insert and rearwardly and upwardly extending arms adapted to embrace and secure the non-vertical support member. The insert is sized to fit within the elbow bracket and has a declivity in the rearward portion thereof having a floor and side walls respectively configured to mate with the end and sides of the non-vertical support member when it is embraced by the arms of the elbow bracket. The forward portion of the insert is provided with a generally vertical bore extending through the body of the insert to receive the second load bearing member in journaled relation. The arms secure the non-vertical support member such that the longitudinal axis thereof intersects that of the second load bearing member at an acute angle.

The insert may be prevented from moving within the elbow bracket solely by the coaction of the support members and the elbow bracket and by the provision of a protuberant boss on the forward portion of the insert and a cooperating bore in the elbow bracket.

In one embodiment of the invention one of the arms of the elbow bracket may be provided with an extension adapted to secure a support brace extending from the non-vertical member.

DESCRIPTION OF THE DRAWINGS

FIG. 1 is a schematic view of a preferred device of the invention in use with a baby carriage cart assembly.

FIG. 2 is a detailed schematic of a preferred connector device of the invention.

FIG. 3 is a cross-sectional view of a connector device of the invention taken along the line 3—3.

FIG. 4 is a schematic view of the insert of the connector device of an embodiment of the invention taken in the direction of arrow 4.

DETAILED DESCRIPTION OF THE INVENTION

While a detailed description of an embodiment of the invention used in conjunction with the baby carriage depicted in FIG. 1 is next discussed, it is to be understood that the connector device of the invention may be employed with any assembly having downwardly extending, generally non-vertical load bearing support members where it is desired to connect such support members to a generally vertically, upwardly extending support member.

With reference to FIG. 1, a baby carriage cart assembly is provided with downwardly extending back support members 2 and front support members 3. Cart assembly 1 is a collapsible assembly which folds together at the center. Support members 3 are provided with brace member 4 extending therebetween to assist in holding the cart assembly in the open position. Support members 3 are immovably secured in connector device 5. Also secured in connector device 5, in journaled relation, are upwardly extending portions 6 of wheel assemblies 7.

Referring now to FIGS. 2 and 3, connector device 5 is comprised first of elbow bracket 8 whose forward portion includes side members 9 and 10, and end member 11 extending therebetween. Side members 9 and 10 rearwardly terminate in upwardly extending arms 12 and 13 adapted to embrace and immovably secure support member 3. In the embodiment of the invention depicted in FIG. 2, arm 13 has member 14 adapted to be pivotally connected to brace member 4. It will be appreciated that the provision of member 14 is not necessary to operation of the invention.

Support member 3 may be secured to elbow bracket 8 in any suitable method as by the provision of perforations 15 in arms 12 and 13 and corresponding bores in support member 3 to receive bolts 16. Other methods of securing support member 3 to mounting bracket 8 are within the scope of the invention and will be readily apparent to those skilled in the art.

Elbow bracket 8 is provided with insert 20 most clearly depicted in FIGS. 3 and 4. Insert 20 is provided with declivity 21 adapted to engage support member 3, viz., in use arcuate wall 22 is in juxtaposition with the side of support member 3 and wall 23 abuts its end. The body of insert 20 is also provided with bore 24 to receive the upwardly extending portion 6 of load bearing wheel assembly 7. As can be appreciated from FIG. 3, arms 12 and 13 secure support member 3 such that the longitudinal axis thereof intersects that of upwardly extending portion 6 at an acute angle A. In a preferred embodiment of the invention upwardly extending portion 6 is a conventional caster assembly secured in journaled relation in insert 20 in the usual manner by washer 25. The particular wheel assembly employed with the connector device of the invention is entirely a matter of design choice readily apparent to those skilled in the art and does not form a part of the invention.

Insert 20 is prevented from moving within mounting bracket 8 in a horizontal direction by coaction of member 3 and walls 22 and 23. The rearward portion of insert 20 is also prevented from moving in a vertical direction by the coaction of support member 3 and wall 23. In the embodiment of the invention depicted in the drawings, insert 20 is additionally provided with protuberant boss 26 which engages bore 27 provided in end member 11. Mechanical interlock of boss 26 and bore 27 aids in preventing vertical movement of insert 20 within elbow bracket 8. It will be appreciated that the particular location and shaping of boss 26 and bore 27 depicted in the drawings but represents a preferred embodiment of the invention. It is within the scope of the invention to provide a protuberant boss and bore locking arrangement at other suitable positions on elbow bracket 8 and insert 20.

Having fully described my invention, it is to be understood that I do not wish to be limited to the details of the embodiments herein set forth or to the details illustrated in the drawings, but my invention is of the full scope of the appended claims.

I claim:

1. A connector device for connecting first and second elongate load bearing members the first of which is journaled in said device and the second of which is immovably affixed thereto such that its longitudinal axis intersects that of the first member at an acute angle, which device comprises a generally U-shaped elbow bracket having a forward component in which is received and secured an insert and rearwardly and upwardly extending arms adapted to embrace and secure said second member, the forward portion of said insert having a generally vertical bore to receive said first member in journaled relation, and the rearward portion of said insert having a declivity having a floor and sidewalls respectively configured to mate with the end and sides of said second member when it is embraced by said arms.

2. A connector device according to claim 1 wherein said bracket, insert and first and second members coact to retain said insert in said bracket exclusive of any other means therefor.

3. A connector device according to claim 2 wherein a protuberant boss on the forward portion of said insert is received in a bore in the forward component of said bracket.

4. A connector device according to claim 2 wherein said insert is formed of a tough, resilient plastic material.

5. A connector device according to claim 2 wherein said floor lies in a plane generally perpendicular to the longitudinal axis of said second member.

6. A connector device according to claim 2 wherein at least one of said arms further comprises an extension adapted to pivotally secure a brace member extending from said elbow brace.

7. A connector device according to claim 2 wherein each of said arms and said second member have at least one bore therein adapted to receive a bolt therethrough whereby said second member may be secured to said arms.

8. A joint assembly comprising at least one downwardly extending non-vertical load bearing support member connected to an upwardly, generally vertically extending load bearing member by the connector device of claim 2.

* * * * *